United States Patent
Robertson et al.

[11] 3,722,599
[45] Mar. 27, 1973

[54] FLUOROCYANOACRYLATES

[75] Inventors: Jerry E. Robertson, North Oaks; Joseph Kenneth Harrington, Edina; Elden H. Banitt, Woodbury Township, Washington County, all of Minn.

[73] Assignee: Minnesota Mining and Manufacturing Company, St. Paul, Minn.

[22] Filed: Aug. 17, 1971

[21] Appl. No.: 172,603

Related U.S. Application Data

[63] Continuation-in-part of Ser. No. 687,111, Dec. 1, 1967, Pat. No. 3,639,361.

[52] U.S. Cl.............128/334 R, 117/124, 117/132, 117/138.8, 260/32.8 N, 260/78.4 N, 260/78.5 N, 260/465.4
[51] Int. Cl................................................C08f 3/42
[58] Field of Search..............260/85.5 R, 85.5 A, 260/88.7, 465.4, 78.4 N, 78.5 N; 128/334

[56] References Cited

UNITED STATES PATENTS

| | | | |
|---|---|---|---|
| 2,765,332 | 10/1956 | Coover et al. | 260/465.4 |
| 2,784,127 | 3/1957 | Joyner et al. | 260/88.7 |
| 2,794,788 | 6/1957 | Coover et al. | 260/88.7 |
| 3,223,083 | 12/1965 | Cobey | 260/78.4 N |
| 3,275,462 | 9/1966 | Strobel et al. | 260/465.4 |
| 3,282,773 | 11/1966 | Wicker et al. | 260/78.4 N |
| 3,360,124 | 12/1967 | Stonehill | 260/78.4 N |
| 3,483,870 | 12/1969 | Coover et al. | 260/78.4 N |
| 3,527,224 | 9/1970 | Rabinowitz | 128/334 R |
| 3,559,652 | 2/1971 | Banitt | 128/334 R |

*Primary Examiner*—Harry Wong, Jr.
*Attorney*—Kinney, Alexander, Sell, Steldt & Delahunt

[57] ABSTRACT

Fluorinated cyanoacrylates having the formula:

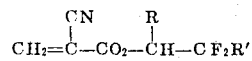

wherein R is hydrogen, methyl or ethyl, R' is fluorine, $-CF_3$ or $-(CF_2)_nH$, and $n$ is an integer from 1 to 3 have been found to be useful biological adhesives which when applied as monomers to aherends rapidly polymerize, e.g., in the presence of even small amounts of moisture, to form strong bonds. The monomers polymerize to films and can be used biologically as hemostatics and tissue adhesives.

11 Claims, No Drawings

FLUOROCYANOACRYLATES

This application is a continuation-in-part, divided from our copending application Ser. No. 687,111 filed Dec. 1, 1967, issued as U. S. Pat. No. 3,639,361 on Feb. 1, 1972.

This invention relates to the method of adhering tissues and effecting hemostasis by polymerizing fluorocyanoacrylates to form coatings and adhesives. More particularly, the invention relates to the process for hemostasis and biological adhesion by fluorine-containing cyanoacrylate monomers which polymerize rapidly upon contact with basic materials, e.g., moisture in the air, to form polymers which coat living mammalian tissues and of which two such coated surfaces are coherent and adhere.

Known non-fluorinated alkyl 2-cyanoacrylates, particularly the methyl, isobutyl and n-butyl 2-cyanoacrylates, have been investigated for use as biological adhesives, see, e.g. Medical World News, 8 (20), 41 (1967); Mfg. Chemist, 38 (8), 94 (1967); Technical Report 6618, Walter Reed Army Medical Center, December, 1966. While the unsubstituted alkyl monomers appear to possess the requisite bonding and hemostatic properties when applied to damaged mammalian tissues, these materials appear to fail to have the required properties of low toxicity and adequate resorption or absorption by the tissues. Methyl 2-cyanoacrylate, for example, gives rise to a severe inflammatory tissue response at the site of application. The n-butyl and isobutyl 2-cyanoacrylate monomers are not absorbed well (if at all) by the tissues and polymeric residue of the adhesive has been observed by histologic examination of the site of application as much as 12 months after surgery, see, e.g. Medical World News, 8 (29), 27 (1967).

Fluorinated cyanoacrylates have been suggested in U.S. Pat. No. 3,255,059 as possible components, i.e., binders, of polymeric rocket propellant compositions. No workable synthetic method is provided for the monomers. No suggestion of the advantages of fluorinated 2-cyanoacrylates for biological applications is made.

It was surprising and unexpected to find that the adhesives of the present invention are readily assimilated by the body with minimal toxic effects although the methods by which the body accomplishes this and intermediate and final products formed are at present unknown.

It is an object of this invention to provide a novel method for effecting biological adhesion and hemostasis. Desirably, the method is effective in the presence of blood and other body fluids and natural healing is not impaired. Other objects will become apparent hereinafter.

It has been found that fluorinated 2-cyanoacrylates are useful in adhesive compositions and are particularly useful as biological adhesives and hemostatic agents. Thus, the present invention provides new methods for the joining together, adhesive suturing of mammalian tissues, as well as for arresting the escape of blood therethrough. For example, satisfactory hemostasis of splenic and liver wounds, heretofore to a great extent unrepairable by conventional methods, is obtained by the application and polymerization of a thin film of fluorinated 2-cyanoacrylate monomer on the injured surface. The bonding strength, absorbability by the tissues, hemostatic capability and low degree of local inflammation resulting when these monomers are applied in vivo, are properties which make them especially valuable for biological applications.

The present invention also contemplates using fluorocyanoacrylates alone, or in conjunction with each other or in conjunction with unsubstituted alkyl 2-cyanoacrylates in the bonding of damaged mammalian tissue or in preventing the escape of blood or other fluids therethrough. Comonomer compositions are of interest for specific uses because they may provide advantageous combinations of properties not completely embodied in individual monomers.

The process of the present invention is possible as a result of the discovery that the replacement of hydrogen atoms in the alcoholic residue of 2-cyanoacrylate esters with fluorine atoms unexpectedly renders these monomers substantially better tolerated by living tissue than are the non-fluorinated hydrocarbon monomers, and provides compounds which are surprisingly more readily biodegraded or absorbed.

The monomeric 2-cyanoacrylate esters which are employed in the process of this invention are represented by the structural formula:

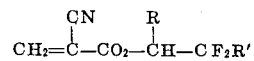

wherein R is a member of the group consisting of hydrogen, methyl or ethyl and R' is a member of the group consisting of fluorine, $-(CF_2)_nH$ and $-CF_3$ and n is an integer from 1 to 3. These new fluorinated monomers when employed in the process of the invention as biological adhesives or hemostats, individually or as comonomers, exhibit excellent wound adhesion and hemostasis; they are well assimilated by the tissues at an acceptable rate, and their use, particularly in the cases of the monomers in which the

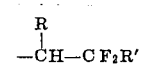

radical is one of $-CH_2(CF_2)_4H$, $-CH_2CF_2CF_3$, $-CH_2(CF_2)_2H$ and $-CH(CH_3)CF_3$ produces minimal local tissue inflammation in mammals. The $-CH_2CF_3$ group-containing monomer, 2,2,2-trifluoroethyl cyanoacrylate, while exhibiting a relatively higher degree of inflammatory tissue response in subcutaneous tissues of mice, was completely biodegraded by the exposed surface of partially excised rat livers within 16 weeks after application of the monomer. The degree of local inflammation caused by the latter monomer, however, is still less than that caused by methyl 2-cyanoacrylate as determined by gross and microscopic examinations.

In most bonding applications employing monomers of the invention, polymerization is catalyzed by small amounts of moisture on the surface of the adherends, thus desired bonding of tissues or hemostasis proceeds well in the presence of blood and other body fluids. The bonds formed are of adequate flexibility and strength to withstand normal movement of tissue. In addition, bond strength is maintained as natural wound healing proceeds concurrently with polymer assimilation.

Compositions employed in the invention are sterilizable by conventional methods such as distillation under aseptic conditions.

The method of the invention for repairing injured tissues (for example, to control bleeding) comprises, in general, sponging to remove superficial body fluids and subsequent application to the exposed tissue of an adhesive composition containing a fluorocyanoacrylate monomer of the group which composition polymerizes to a thin film of polymer while in contact with the tissue surface. Tissues which are not bleeding or otherwise covered by body fluids need not be sponged first. For bonding separate surfaces of body tissues, the monomer is applied to at least one surface, and the surfaces are brought quickly together while the monomer polymerizes in contact with both of the surfaces.

The process of the invention is particularly useful for dental applications such as controlling the bleeding following extractions, bleeding accompanying prophylaxis or restorations, and bleeding due to gingevectomy and other periodontal treatments.

The process of the invention employs adhesive formulations in which fluoroalkyl 2-cyanoacrylates are the major active constituent suitably combined in admixture with a polymerization inhibitor such as sulfur dioxide. One or more adjuvant substances, such as thickening agents, plasticizers, or the like, to improve the surgical utility of the monomer, can also be present.

Depending on the particular requirements of the user, these adhesive compositions can be applied by known means such as with a glass stirring rod, sterile brush or medicine dropper; however, in many situations a pressurized aerosol dispensing package is preferred in which the adhesive composition is in solution with a compatible anhydrous propellant. Aerosol application of the monomers is particularly advantageous for use in hemostasis.

The monomers are readily polymerized to addition-type polymers and copolymers, which are generally optically clear (as films) having the general formula:

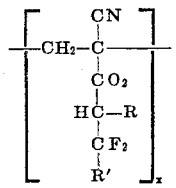

where R and R' are as defined above and $x$ is a number from 5 to 500.

The preferred method for preparing high purity (95 percent or greater) fluoroalkyl 2-cyanoacrylates comprises catalyzing the condensation of formaldehyde with esters of cyanoacetic acid by means of a mixture of an acid and the acidic salt of an alkyl primary or secondary amine.

This method is described in detail in the parent U.S. Pat. Application Ser. No. 687,111 and corresponding foreign applications and patents, e.g., Netherlands Ser. No. 68/17168 and Great Britain Pat. No. 1,211,172.

The following examples will illustrate preferred embodiments of the invention. It will be understood, however, that the examples are included merely for the purposes of illustration and not intended to limit the scope of the invention, unless otherwise specifically indicated. All parts are by weight unless otherwise specified, and the pressures are shown in millimeters of mercury.

EXAMPLE 1

Discs of polymer are made by injecting test monomer subcutaneously in female rats and allowing it to polymerize. The chunks of polymer are recovered approximately 24 hours later, washed, vacuum dried, weighed and then implanted subcutaneously in the dorsal neck tissue of a second group of mice. Stainless steel wound clips are used to close the skin incisions. Animals are sacrificed at 2, 4, 8 and 16 weeks, and the material is recovered, washed, dried and reweighed then reimplanted. Local and systemic gross tissue reactions and adhesions are noted at necropsy. Absorption of the test material is determined on the basis of weight loss.

The compounds enumerated in Table 1 were evaluated using this general method.

TABLE 1

| Compound | Absorption at 16 weeks |
|---|---|
| I) 1,1,5-trihydroperfluoro-n-pentyl 2-cyanoacrylate | 35% (average of three different lots) |
| II) 1,1,1-trifluoroisopropyl 2-cyanoacrylate | 17% (average of five different lots) |
| III) 2,2,2-trifluoroethyl 2-cyanoacrylate | 100% |
| IV) 1,1-dihydroperfluoro-n-propyl 2-cyanoacrylate | 100% (2 weeks) |
| V) 1,1,3-trihydroperfluoro-n-propyl 2-cyanoacrylate | 100% (2 weeks) |

EXAMPLE 2

Hemostasis in Vascular Organs (Excised Cat Spleen)

A male cat was anesthetized intravenously with pentobarbital-sodium and prepared for aseptic surgery. Prior to surgery, 25 milligrams of heparin sodium USP were intravenously administered. The spleen was exteriorized through a ventral midline incision, and a disk-shaped portion of splenic tissue 1 to 2 centimeters in diameter and 3 to 5 millimeters deep was excised. Resulting profuse hemorrhage from the wound was controlled by occluding the blood supply to the spleen with soft clamps and gauze sponging. A thin layer of 2,2,2-trifluoroethyl 2-cyanoacrylate adhesive monomer was applied to the wound surface immediately thereafter by spraying with an aerosol at a distance of from 4 to 8 centimeters from the wound surface. After allowing sufficient time for polymerization of the monomer, the organ was replaced in the peritoneal cavity. The ventral midline incision was closed using conventional sutures.

The cat, except for depression during the first few post-operative days, made an uneventful recovery and remained healthy until sacrificed 6 weeks after surgery. Adhesions between the spleen and surrounding tissue, an expected sequela following surgery of this nature, and mild inflammation of the splenic capsule were the only gross tissue changes observed at necropsy. None of the adhesive was grossly visible and normal healing appeared to be in progress.

In a similar manner, other compounds as designated in Example 1 were used for hemostasis of excised female rat spleen as shown in Table 2.

TABLE 2

| Compound | Method of Application | Hemostasis | Tissue Irritation |
|---|---|---|---|
| I | liquid | good | none |
| II | liquid | excellent | very little |

EXAMPLE 3

Hemostasis in Vascular Organs (Excised Rat Liver)

The liver of an anesthetized animal is exteriorized and the distal one-fourth to one-third of the left lateral lobe is excised. Hemorrhage is controlled by digital compression while a thin coating of test material is applied in either liquid or aerosol form. After allowing sufficient time for polymerization, the digital pressure is released. The liver is replaced in the peritoneal cavity and the muscle and skin wounds are closed with conventional sutures. Adhesive handling and hemostatic properties are recorded at the time of application. Absorption rates of the test materials are noted at necropsy 2, 4 and 8 weeks following liquid application and 1, 2 and 4 or more weeks after spraying.

The compounds (as designated in Example 1) tabulated in Table 3 were evaluated using this general method.

TABLE 3

| Compound | Form Applied | Hemostasis | Estimated Absorption |
|---|---|---|---|
| III | aerosol | good | 1) 100% at 16 weeks |
| IV | liquid | 1) good | 1) 100% at 4 weeks |
|  |  | 2) poor | 2) 100% at 2 weeks |
| V | liquid | 1) fair | 1) 100% at 8 weeks |
|  |  | 2) good | 2) 100% at 2 weeks |
| II & III Copolymer (50/50) | liquid | good | slightly at 8 weeks |

EXAMPLE 4

Skin Incision Test

Single midline skin incisions are made in the dorsal neck region of anesthetized rats. Blood is allowed to flow before sponging the wound with gauze. The test material is applied and spread as a thin coating along the wound edge. Immediately following adhesive application, the wound edges are apposed using digital pressure and tissue forceps. After allowing sufficient time for polymerization, the forceps are released. Each animal is postoperatively observed for general condition and the wounds are scored at 24 hours using the following code:

OPEN-POOR (OP) wound edges open — poorly aligned
OPEN-FAIR (OF) wound partially open — fair alignment
CLOSED-FAIR (CF) wound closed — fair alignment
CLOSED-GOOD (CG) wound completely closed— good alignment Following 24 hours wound scoring, the representative closed-good animals and, in some cases, closed-fair animals are sacrificed and the center section of the wound, 3 cm. long by 2 cm. wide, is dissected free. One side of the wound is placed in a fixed clamp and the other side in a clamp attached to a suspended plastic container. Water is allowed to flow into the container at a constant rate until the wound separates. The weight of the container plus the added water determines wound tensile strength measured as grams to give separation. Compounds as designated in Example 1 were tested by this method with the results set forth in Table 4.

TABLE 4

| Compound | 24 Hour Wound Appearance | Average Wound Tensile Strength in Grams |
|---|---|---|
| I | CG 10/10 | 664 |
| II | CG 10/10 | 575 |
| III | CG 8/10 | |
|  | CF 1/10 | 426 |
|  | OP 1/10 | |
| IV | CF 4/10 | |
|  | CF 1/10 | |
|  | CF 3/10 | 314 |
|  | OP 2/10 | |
| V | CG 6/10 | 326 |
|  | CF 1/10 | 241 |
|  | OP 3/10 | |
| II&III Copolymer (50/50) | CG 10/10 | 389 |

EXAMPLE 5

Hemostasis in Oral Surgery

Male Rhesus monkeys were anesthetized with a 2 percent solution of thiamylal (intravenous) and four canine teeth of each monkey were extracted. The hemorrhaging of the tooth socket was controlled by application of 1,1,1-trifluoroisopropyl 2-cyanoacrylate spray. The aerosol spray composition was 10.6 percent monomer (by weight) and the propellant was 30 percent dichlorodifluoromethane, 25 percent trichloromonofluoromethane and 45 percent 1,2-dichlorotetrafluoroethane. After 5 days, all monkeys had recovered and were able to eat their normal diet. Healing was complete, with all sockets filled in, 1 month after surgery.

What is claimed is:

1. A process for the repair of living tissue which comprises applying to a surface of said tissue a composition comprising a monomer represented by the formula:

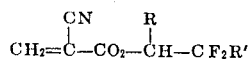

wherein R is a member of the group consisting of hydrogen, methyl or ethyl, R' is a member of the group consisting of fluorine, $-CH_3$ and $-(CF_2)_nH$ and $n$ is an integer from 1 to 3 and permitting polymerization thereof in contact with said surface.

2. The process for the repair of living tissue according to claim 1 comprising the additional step of at least partially freeing the surface from superficial body fluids before application of monomer containing composition.

3. The process for the repair of living tissue according to claim 1 comprising the additional step of apposing the surface to which monomer is first applied to a second surface of tissue and maintaining contact while polymerization of the monomer proceeds.

4. The process for the repair of living tissue according to claim 3 wherein monomer is additionally applied to the second surface before first and second surfaces are apposed.

5. The process of claim 1 wherein the living tissue is a vascular organ.

6. The process according to claim 1 wherein the monomer is applied in finely divided form as a spray until a coating of a desired amount is present on the tissue being repaired.

7. The process according to claim 6 wherein the tissue being repaired is a vascular organ.

8. The process according to claim 6 wherein oral tissue is repaired.

9. The process according to claim 1 wherein the monomer is 1,1,1-trifluoroisopropyl 2-cyanoacrylate.

10. The process according to claim 3 wherein the monomer is 1,1,1-trifluoroisopropyl 2-cyanoacrylate.

11. The process according to claim 5 wherein the monomer is 1,1,1-trifluoroisopropyl 2-cyanoacrylate.

* * * * *